(12) United States Patent
Raorane et al.

(10) Patent No.: US 9,148,000 B2
(45) Date of Patent: Sep. 29, 2015

(54) SWITCHGEAR ASSEMBLY INCLUDING A TRANSPARENT VIEWING PORT FOR VISUAL OBSERVATION OF CONTACTS

(75) Inventors: Deepak Raorane, Maharashtra (IN); Ashish Agrawal, Rajasthan (IN)

(73) Assignee: Schneider Electric Infrastructure Limited, Gujarat (IN)

( * ) Notice: Subject to any disclaimer, the term of this patent is extended or adjusted under 35 U.S.C. 154(b) by 672 days.

(21) Appl. No.: 13/432,981

(22) Filed: Mar. 28, 2012

(65) Prior Publication Data

US 2012/0247933 A1    Oct. 4, 2012

(30) Foreign Application Priority Data

Mar. 28, 2011    (IN) .............................. 848/DEL/2011

(51) Int. Cl.
| | | |
|---|---|---|
| *H02B 1/20* | (2006.01) | |
| *H02B 1/30* | (2006.01) | |
| *H01H 1/00* | (2006.01) | |
| *H02B 5/00* | (2006.01) | |
| *H01H 9/02* | (2006.01) | |
| *H02B 13/045* | (2006.01) | |

(52) U.S. Cl.
CPC ............. *H02B 1/306* (2013.01); *H01H 1/0015* (2013.01); *H01H 2009/0292* (2013.01); *H02B 13/045* (2013.01)

(58) Field of Classification Search
CPC .... H02B 1/306; H02B 13/045; H01H 1/0015; H01H 2009/0292
USPC .......................... 361/601–640; 200/61.84, 317
See application file for complete search history.

(56) References Cited

U.S. PATENT DOCUMENTS

| | | | |
|---|---|---|---|
| 5,062,022 A | | 10/1991 | Beard et al. |
| 5,864,107 A | * | 1/1999 | French et al. .............. 200/50.01 |
| 6,373,355 B1 | * | 4/2002 | Postmus et al. ................. 335/17 |
| 6,501,572 B1 | * | 12/2002 | Poth et al. ...................... 361/605 |
| 8,723,069 B2 | * | 5/2014 | Jecke et al. ...................... 218/43 |
| 2009/0015991 A1 | * | 1/2009 | Hyrenbach et al. ........... 361/612 |

FOREIGN PATENT DOCUMENTS

| | | |
|---|---|---|
| DE | 8904138 U1 | 10/1989 |
| DE | 296 08 127 | 7/1996 |
| DE | 19653683 C1 | 6/1998 |
| DE | 202014104584 | 10/2014 |
| DE | 20 2014 104 584 | * 11/2014 |

(Continued)

OTHER PUBLICATIONS corresponding EP App. No. 12160571 Search report dated Feb. 28, 2014.

(Continued)

*Primary Examiner* — Zachary M Pape
(74) *Attorney, Agent, or Firm* — D. Peter Hochberg; Sean F. Mellino

(57) ABSTRACT

A switchgear assembly includes a tank housing encapsulating switching contacts which are viewable through a transparent viewing port after illumination of the contacts. A reflective optical device for observing the position of the switching contacts is used to view the contacts at a safe distance outside of the tank housing through the transparent viewing port. An illuminating device is used to illuminate the switching contacts by directing the light from the illuminating device on the switch contacts.

13 Claims, 3 Drawing Sheets

(56) References Cited

FOREIGN PATENT DOCUMENTS

| GB | 599421 | * | 3/1948 |
| GB | 599421 | A | 3/1948 |
| GB | 2265470 | A | 9/1993 |
| WO | WO 2005/122352 | A1 | 12/2005 |

OTHER PUBLICATIONS corresponding CN App. No. 201210074796.6 Office action dated Jun. 23, 2014.
corresponding CN App. No. 201210074796.6 Office action dated Dec. 3, 2014.

* cited by examiner

SWITCHGEAR ASSEMBLY INCLUDING A TRANSPARENT VIEWING PORT FOR VISUAL OBSERVATION OF CONTACTS

This application claims priority of Indian Application Serial No. 848/DEL/2011 filed on Mar. 28, 2011.

BACKGROUND OF THE INVENTION

1. Field of the Invention

The present invention relates to electrical equipment. In particular, this invention relates to systems for detecting the state of electrical contacts in enclosed electrical equipment such as switchgears. More particularly, this invention relates to viewing the rotary knife blade contact earthing or grounding system in electrical equipment such as switchgears.

2. Description of the Prior Art

Switchgears are used in the electric power systems or grids and basically refer to the combination of disconnectors, fuses and/or circuit breakers used to isolate electrical equipment from the mains or alternating current (AC) electrical power supply. Switchgears are used to de-energize equipment to allow work to be done and to clear faults in the electrical equipment. This type of equipment is important because it is directly linked to the connectivity of the electricity supply.

The earliest central power stations used simple open knife switches, mounted on insulating panels of marble or asbestos. However, increasing power levels and voltages have made open manually-operated switches very dangerous to use for anything other than isolation of a de-energized circuit. By the early 20th century, a switchgear line-up was made up of a metal-enclosed structure with electrically-operated switching elements, using oil circuit breakers. Today, oil-filled equipment has largely been replaced by gas insulated equipment allowing large currents and power levels to be safely controlled.

High voltage switchgears were invented at the end of the 19th century for operating motors and others electric machines. The technology has been improved over time and is used with voltages up to 1,100 kV. However, until this date there is a need to manually view the contacts. Since it is tedious to view the contacts in an enclosed housing, and the result yielded by the sensors is not 100 percent guaranteed, there is a need for a manual mechanism to view the internal parts in the enclosed electrical equipment.

In case of gas insulated switchgears, the position of the switch and contacts cannot be viewed from the front side even if a front inspection window is provided due to its design restrictions. Further, it is not advisable to risk the life of workers during maintenance work if the state of the equipment cannot be properly determined. In the prior art, a cut-out was directly provided on the front side of the equipment to view the position of the contacts. However, such solution has not been successful due to the construction, position and design limitations. Further, variable case sizes and switch orientation has limited implementation of this technology. Also, the presence of gas within the housing further reduces visibility of the operator. In another arrangement, the position of the switch was changed to bring the earthing or grounding switch on top with linear motion contacts inside transparent glass insulation so that the position of the contacts can be seen clearly. However, this arrangement escalates the cost of the equipment due to the requirement of a new switch to meet such design changes.

German Patent No. 296 08 127 discloses endoscope devices wherein the endoscope devices are directly guided through guide tubes to the inspection windows of the switch panels, to be able to view the contact points arranged behind these inspection windows. The guide tubes of the switch panels are accessible from the front side, so that the operating personnel can directly manipulate the endoscope devices from the operating side of the switch panels.

The endoscope devices are equipped with an optical lens at their free end and also have a light source, allowing the contact areas arranged in the housings of the switch panels to be observed using these endoscope devices. At the same time, endoscope devices must be positioned in such a way that both the image segment and the image brightness are adequate to be able to assess the contact points with sufficient reliability.

Therefore, there is a need to view and provide illumination inside enclosed electrical equipment in a more efficient and cost effective manner.

SUMMARY OF THE INVENTION

It is an object of the present invention to provide a switchgear assembly for visually observing the position of the contacts inside the housings.

It is also an object of the invention to provide a switchgear assembly which may be installed on site or at a factory wherein the contacts enclosed in the tank circuit can be viewed clearly.

It is yet another object of the invention to provide a switchgear assembly which mitigates the need for changing the viewing angle to view polyphase contacts.

It is yet another object of the invention to provide a switchgear assembly having a simplified operation.

It is yet another object of the invention to provide a switchgear assembly with additional safety measures.

It is yet another object of the invention to provide a switchgear assembly which is economic in construction and operation.

It is yet another object of the invention to provide a switchgear assembly which is compact in design.

According to an aspect of the invention, a switchgear assembly includes a tank housing encapsulating switching contacts which are viewable through a transparent viewing port after illumination of the contacts. A reflective optical device for observing the position of the switching contacts is used to view the contacts at a safe distance outside of the tank housing through the transparent viewing port. An illuminating device is used to illuminate the switching contacts by directing the light from the illuminating device on the switch contacts so that the position of the contacts is seen clearly and maintenance work can be carried out safely by the maintenance staff.

BRIEF DESCRIPTION OF THE DRAWINGS

Hereinafter, the invention is described in more detail by means of the drawings wherein.

DETAILED DESCRIPTION OF THE PREFERRED EMBODIMENT

Figure 1:
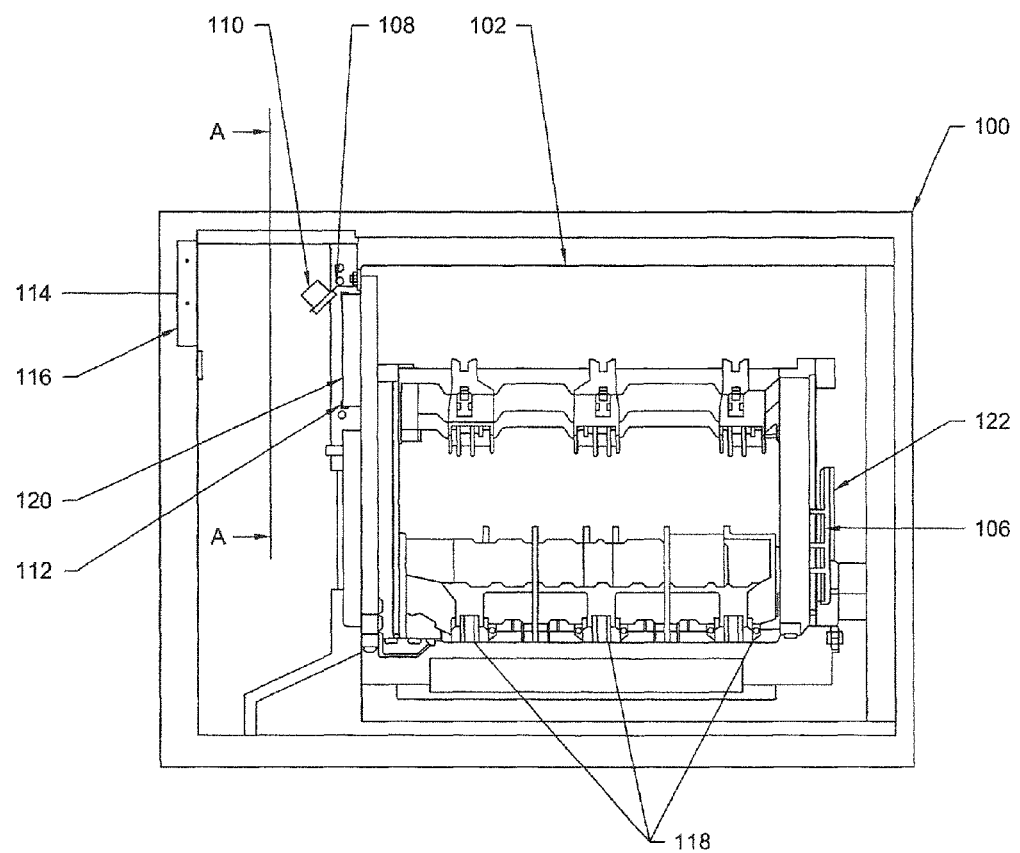
FIG. 1 illustrates a side view of the switchgear assembly according an embodiment of this invention.

The invention may be better understood and further advantages and uses thereof more readily apparent when considered in view of the following detailed description of exemplary embodiments taken with the accompanying drawings. These embodiments describe only a few of the various ways in which the principles of various other embodiments may be realized and the described embodiments are intended to include all such embodiments and their equivalents and the reference numerals used in the accompanying drawings correspond to the like elements throughout the description.

FIG. 1 illustrates a switchgear assembly (100) having a tank housing (102) which encapsulates a rotary knife blade contact earthing or grounding system, a reflecting surface (106) and high voltage equipment which needs to be secured from the operator for safety of the operator. Tank housing (102) has a bracket (108) welded on to it for mounting at least one external light source or illuminating device (110) wherein light source (110) is directed inside the housing (102) through at least one hermetically sealed viewing port (112). Further, an additional or second viewing port or inspection window (114) is provided on a front frame (116) at a distance from the tank housing (102) so that operator will be at a safe distance from tank housing (102).

Tank housing (102) is a gas-tight encapsulating electric enclosure formed from electrically resistant material and surrounds one or more contacts (118). Tank housing (102) has an electrode (not shown) disposed at a higher potential in respect of the enclosure. Tank housing (102) has an electrically insulating gas disposed within so that the inner-disposed electrode is insulated from the outer enclosure. Contacts (118) are arranged in an internal area of tank housing (102) and have a contact point which can move relative to one another between closed, open and ground positions. Tank housing (102) is formed from a material through which optical rays cannot pass and has a viewing port or inspection window (112) in the wall to observe the position of the contacts within tank housing (102).

Viewing port or inspection window (112) has a focusing lens (120) which is formed from a gas-tight material through which visible light can pass, such as glass. The lens system (120) is designed to be gas-tight and pressure-resistant. Depending on the requirement, the position of the contacts (118) can be monitored via the lens system (120) wherein manual monitoring is carried out by an operator. According to another embodiment of the present invention, viewing port or inspection window (112) has a pressure sensor (not shown) for detecting a pressure overload before the bursting limit of viewing port or inspection window (112) is reached.

In case a fault occurs, it is necessary to inspect the faulty area to evaluate the damage and determine whether the damaged parts have to be replaced or repaired. To do this in an efficient manner, it is necessary to have an efficient inspection system which allows visual observation of the contacts and determine manually if the contacts are in a grounded position without removing the insulating gas. While doing manual monitoring, the operator observes contacts (118) within tank housing (102) through second viewing port or inspection window (114) which is formed on front frame (116). Front frame (116) is an extension of the top of tank housing (102) in the horizontal direction wherein second viewing port or inspection window (114) is placed further away from tank housing (102), thus providing additional security to the user operating the switchgear assembly. The location of second viewing port or inspection window (114) is such that the operator is able to view reflecting surface (106) through the light passing through viewing port or inspection window (112) in tank housing (102). Since tank housing (102) is made from an optical light resistant material, the mirror reflection will not be clearly visible inside tank housing (102). Therefore external light source (110) such as a Light Emitting Diode (LED) or more than one light source is mounted on the bracket (108) near where the light passes through viewing port or inspection window (112) on the exterior of tank housing (102). LED (110) is mounted on bracket (108) in such a way that the optical axis of the rays emitted from the LED (110) and the optical axis of the rays incident on the operators eye at second viewing port or inspection window (114) are aligned to provide proper illumination of the contacts. Generally a light flux having a minimum 300 lumens is provided to LED (110) by using an AC to DC converter (not shown) in connection with the LED (110) to clearly observe the position of contacts (118) within tank housing (102). Reflecting surface (106) is a mirror mounted on a bracket (122), such that all the contacts (118), which may be polyphase contacts, are visible in mirror (106) from a single angle. Mirror (106) and bracket (122) form an integral part of switch gear assembly (100) and have a fixed relative position with switch gear assembly (100) wherein cleaning of mirror (106) is not required during its lifetime, thus avoiding any relative movement of mirror (106) and any loss resulting thereof. As known in the art, polyphase contacts are used to provide a more efficient distribution of alternating current electrical power. According to another embodiment of the present invention, no markings on contacts will be required as only contacts (118) of interest will be visible to the operator and thus the operator will not be confused with others parts of switchgear assembly (100).

Figure 2:
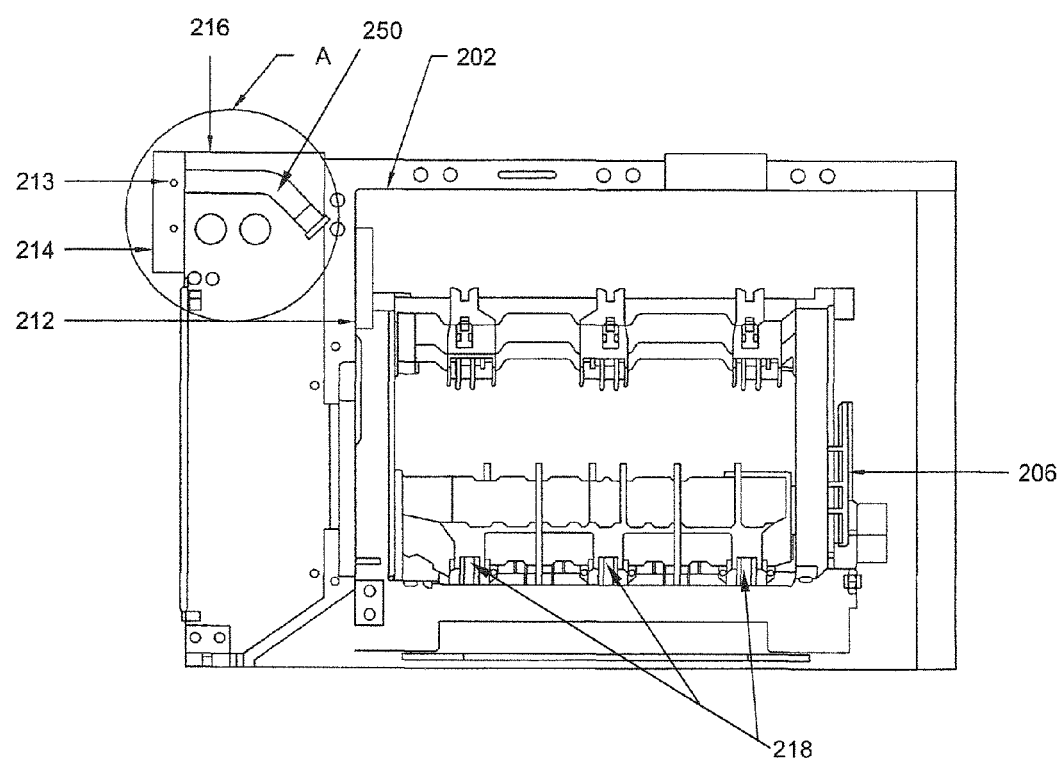
FIG. 2 illustrates an exploded view of the switchgear assembly according to another embodiment of the present invention.

FIG. 2 illustrates another embodiment of the present invention wherein front frame (216) has two windows. One window (214) for viewing the contacts (218) in tank housing (202) and other window (213) for illuminating contacts (218) via a torch or other illuminating device (210) known in the art. Window (213) is operationally connected to a steel or plastic tube or tunnel (250) having a reflecting coating on the interior surface. In the alternative, a reflecting surface may be placed inside tunnel (250) instead of a reflective coating. Tunnel (250) is placed such that light passes through it and reaches the reflective surface on the rear side of tank housing (202) through the light passage viewing port (212) in tank housing (202). Thus, the operator is able to clearly observe the contacts in reflecting mirror (206) through the light passage viewing port (212) in tank housing (202) and viewing port or inspection window (214) in front frame (216).

Figure 3:
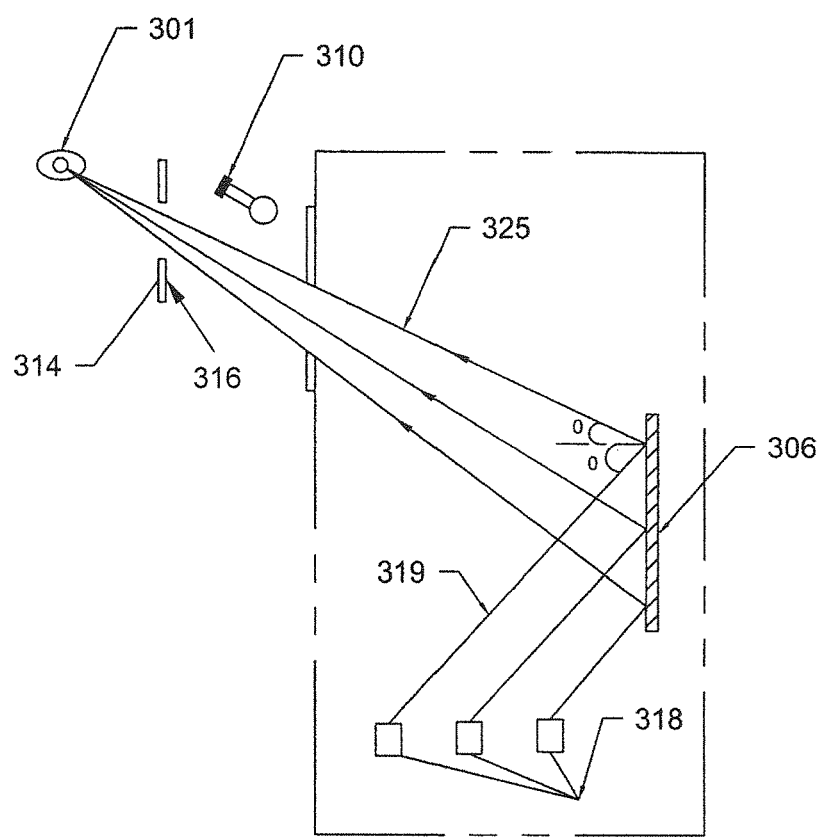
FIG. 3 illustrates the working of the switchgear assembly according to one embodiment of the present invention.

FIG. 3 illustrates the working model of the present invention wherein an operator (301) is able to view an image of contacts (318) when he places his or her eye near a viewing port or inspection window (314) on a front frame (316). Light rays (319) emanating from contacts (318) incident on a reflecting surface (306) at a certain angle, form an image of contacts on a reflecting surface (306). Reflected light rays (325) are reflected at the same angle normal to the plane to the reflecting surface. In order to view the image of contacts (318), contacts (318) need to be illuminated properly so that rays (325) are able to reach the eye of operator (301) after all reflection, partial refraction and absorption of light in the medium in which rays (325) travel. Thus, an illuminating device or LED (310) or torch in combination with an endoscopic tunnel (not shown) is aligned such that the optical axis of rays (325) reaching the eye of the operator from reflecting surface (306) and the rays of light emanated by illuminating device (310) have a similar path.

When the switch is in the earth or ground position and contacts (318) are needed to be seen to ensure the proper earthing or grounding, illuminating device (310) is switched on to illuminate the contacts (318). Light rays (319) emanating from switch contacts (318) travel towards the reflecting surface (306) forming an image of contacts. The reflected rays pass through the different transparent windows (not shown) and operator (301) observes the clear image of earthing or grounding contacts (318) to determine whether it is safe for the maintenance staff to carry out the maintenance work.

According to another embodiment of the invention, a light passage viewing port or inspection window in tank housing, inspection window on the front frame and the reflecting surface mounted on the bracket are aligned together in such a way that the contacts will be visible only when the contacts are in the grounded position. Thus, any confusion is avoided that is created due to positioning of the contacts. According to another embodiment of the present invention, the LED will be switched on only when the contacts are in the grounded position. Thus, the contacts will be visible when the light source is in grounded position.

In view of the present disclosure which describes the current best mode for providing a switchgear assembly, many modifications and variations would present themselves to those skilled in the art without departing from the scope and spirit of this invention. All changes, modifications and variations coming within the meaning and range of equivalency are considered within the scope.

What is claimed:

1. A switchgear assembly comprising:
   a tank housing having a front side and encapsulating at least one switching contact;
   at least one transparent viewing port on said front side of said tank housing;
   at least one external light source for illuminating the at least one switching contact;
   at least one reflective optical device for observing the position of said at least one switching contact in said tank housing;
   a front frame located outside of said tank housing; and
   at least one second transparent viewing port on said front side of said tank housing or said front frame for viewing a reflection of said at least one switching contact on said at least one reflective optical device through said at least one transparent viewing port,
   wherein said at least one reflective optical device illuminates said at least one switching contact by directing light from said at least one external light source on said at least one switching contact.

2. A switchgear assembly as claimed in claim 1, wherein said optical device and said at least one transparent window are positioned relative to each other to render said at least one switching contact observable while said at least one switching contact is in earth position.

3. A switchgear assembly as claimed in claim 1, wherein said at least one transparent viewing port is hermetically sealed for viewing said at least one switching contact.

4. A switchgear assembly as claimed in claim 1, wherein said at least one reflective optical device is a reflecting mirror.

5. A switchgear assembly as claimed in claim 4, wherein said mirror is mounted on a bracket on a rear side of said tank housing.

6. A switchgear assembly as claimed in claim 1, wherein the position of said at least one transparent viewing port and said at least one switching contact is aligned to observe said at least one switching contact in one viewing angle.

7. A switchgear assembly as claimed in claim 1, wherein said front frame extends away from said tank housing in a horizontal plane to provide additional distance between an operator and said tank housing.

8. A switchgear assembly as claimed in claim 1, wherein said at least one external light source is a Light Emitting Diode (LED).

9. A switchgear assembly as claimed in claim 1, wherein light illuminated from said at least one external light source is directed on said at least one reflective optical device.

10. A switchgear assembly as claimed in claim 1, wherein said at least one external light source has a minimum light flux of 300 lumens.

11. A switchgear assembly as claimed in claim 1, wherein said tank housing is capable of being filled with a gas.

12. A switchgear assembly as claimed in claim 1, wherein said at least one switching contact is a knife blade contact.

13. A switchgear assembly as claimed in claim 12, wherein said at least one knife blade contact is movable between a closed position, an open position and a grounded position.

* * * * *